United States Patent
Iguchi

(10) Patent No.: US 10,650,966 B2
(45) Date of Patent: May 12, 2020

(54) MULTILAYER CERAMIC ELECTRONIC COMPONENT

(71) Applicant: TDK CORPORATION, Tokyo (JP)

(72) Inventor: Toshihiro Iguchi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/270,975

(22) Filed: Feb. 8, 2019

(65) Prior Publication Data

US 2019/0304681 A1    Oct. 3, 2019

(30) Foreign Application Priority Data

Mar. 27, 2018    (JP) ................. 2018-060368

(51) Int. Cl.

| H01G 4/30 | (2006.01) |
|---|---|
| H01G 4/015 | (2006.01) |
| H01G 4/008 | (2006.01) |
| H01G 4/12 | (2006.01) |
| H01G 4/232 | (2006.01) |
| H01G 4/248 | (2006.01) |

(52) U.S. Cl.
CPC ............ H01G 4/015 (2013.01); H01G 4/008 (2013.01); H01G 4/1209 (2013.01); H01G 4/1227 (2013.01); H01G 4/30 (2013.01); H01G 4/232 (2013.01); H01G 4/248 (2013.01)

(58) Field of Classification Search
CPC .......... H01G 4/005; H01G 4/008; H01G 4/01; H01G 4/12; H01G 4/30; H01G 4/248; H01G 4/232; H01G 4/1227; H01G 4/2325

See application file for complete search history.

(56) References Cited

U.S. PATENT DOCUMENTS

| 8,971,017 B1* | 3/2015 | Nakamura | H01G 4/012 |
| | | | 361/301.4 |
| 10,510,490 B1* | 12/2019 | Kang | H01G 4/1227 |
| 2006/0245141 A1* | 11/2006 | Shirasu | H01G 4/012 |
| | | | 361/303 |
| 2009/0086404 A1* | 4/2009 | Masuda | H01G 4/012 |
| | | | 361/303 |
| 2013/0094121 A1* | 4/2013 | Endo | H01G 4/30 |
| | | | 361/305 |
| 2014/0063685 A1 | 3/2014 | Lee et al. | |
| 2015/0070817 A1* | 3/2015 | Morita | H01G 4/1209 |
| | | | 361/301.4 |
| 2016/0217930 A1* | 7/2016 | Yamaguchi | H01G 4/30 |

FOREIGN PATENT DOCUMENTS

JP    2014-053589 A    3/2014

* cited by examiner

Primary Examiner — Nguyen T Ha
(74) Attorney, Agent, or Firm — Oliff PLC

(57) ABSTRACT

A multilayer ceramic electronic component such as a multilayer ceramic capacitor capable of maintaining insulation properties even when a current is passed through the capacitor after an occurrence of a short-circuit due to, for example, a high voltage or a high current is provided. A multilayer ceramic electronic component including an element body 4 formed by laminating dielectric layers 10 and internal electrode layers 12 alternately. The internal electrode layers contains copper and/or silver as a main component. The dielectric voidage is lower than the internal electrode voidage.

8 Claims, 4 Drawing Sheets

MULTILAYER CERAMIC ELECTRONIC COMPONENT

BACKGROUND OF THE INVENTION

The present invention relates to a multilayer ceramic electronic component such as a multilayer ceramic capacitor.

For example, as described in Patent Document 1, a multilayer ceramic capacitor including dielectric layers made mainly of barium titanate and internal electrode layers made mainly of nickel is known. Such a multilayer ceramic capacitor is used for many applications. For such an element body made of a multilayer body including the dielectric layers and the internal electrode layers, it has been considered that the less voids in an interior thereof, the better.

Patent Document 1: Japanese Patent Laid-Open No. 2014-053589

However, the present inventor has found that when a current is passed through the capacitor, in particular, the multilayer ceramic capacitor having the internal electrode layers made mainly of nickel after an occurrence of a short-circuit due to, for example, a high voltage or a mechanical stress, the capacitor may generate heat and thus may heat up a mounting substrate.

BRIEF SUMMARY OF INVENTION

In view of such circumstances, it is an object of the invention to provide a multilayer ceramic electronic component such as a multilayer ceramic capacitor capable of maintaining insulation properties even when a current is passed through the capacitor after an occurrence of a short-circuit due to, for example, a high voltage or a high current.

In order to achieve the above-described object, the invention provides a multilayer ceramic electronic component comprising an element body including dielectric layers and internal electrode layers having different polarities laminated alternately, wherein the internal electrode layers contain copper and/or silver as a main component and a dielectric voidage of the dielectric layers is lower than an internal electrode voidage of the internal electrode layers, the dielectric voidage indicates a proportion of a length of voids existing on a dielectric line segment with respect to a predetermined length of the dielectric line segment passing through a thickness-wise center of a freely selected layer of the dielectric layers and extending along a longitudinal direction of the dielectric layers, and the internal electrode voidage indicates a proportion of a length of voids existing on an internal electrode line segment with respect to a predetermined length of the internal electrode line segment passing through a substantially thickness-wise center of a freely selected layer of the internal electrode layers and extending in a longitudinal direction of the internal electrode layers.

In the multilayer ceramic electronic component according to the invention, the internal electrode layers contain copper or silver as a main component. The dielectric voidage is lower than the internal electrode voidage.

With such conditions described above satisfied, the multilayer ceramic electronic component according to the invention is allowed to restore insulation properties (self-repairing properties) by passing a current through an electronic component after having been subjected to a short-circuit due to, for example, a high voltage or a mechanical stress. Therefore, even when a current is passed again through the electronic component having been subjected to the short-circuit, probability of heat generation is low because the insulation properties are secured.

The reason why the insulation properties are restored by passing a current again through the electronic component having been subjected to the short-circuit is considered as follows. It seems that when the above-described conditions are satisfied, a current flowing again through a portion where the short circuit of the internal electrode layers occurred makes internal electrodes fuse and scatter, and consequently, the insulation properties are restored. If the dielectric layers have many voids, a current passed again may cause the short-circuit because the internal electrodes fused and run through the voids existing in the dielectric layers may be connected to an internal electrode layer having an opposite polarity. In contrast, the multilayer ceramic electronic component of the present invention includes a predetermined voids in the internal electrode layers and in addition the voids in the dielectric layers are limited. Specifically, the dielectric voidage is lower than the internal electrode voidage. Therefore, even when the internal electrodes fuse, the fused internal electrodes may stay in the internal electrode layers without running along the dielectric layers. Therefore, self-repairing seems to be promoted.

Preferably, the dielectric layers include a main component including barium titanate and an accessory component including boron oxide and/or lithium oxide. In this configuration, low-temperature sintering of the dielectric layers is enabled and thus the multilayer ceramic electronic component having internal electrodes made of copper is easily manufactured.

Preferably, the dielectric voidage is 0.7 times the internal electrode voidage or lower. In this configuration, insulation properties are easily restored after an occurrence of a short circuit.

Preferably, the predetermined length ranges from 10 μm to 50 μm.

DETAILED DESCRIPTION OF INVENTION

Figure 1:
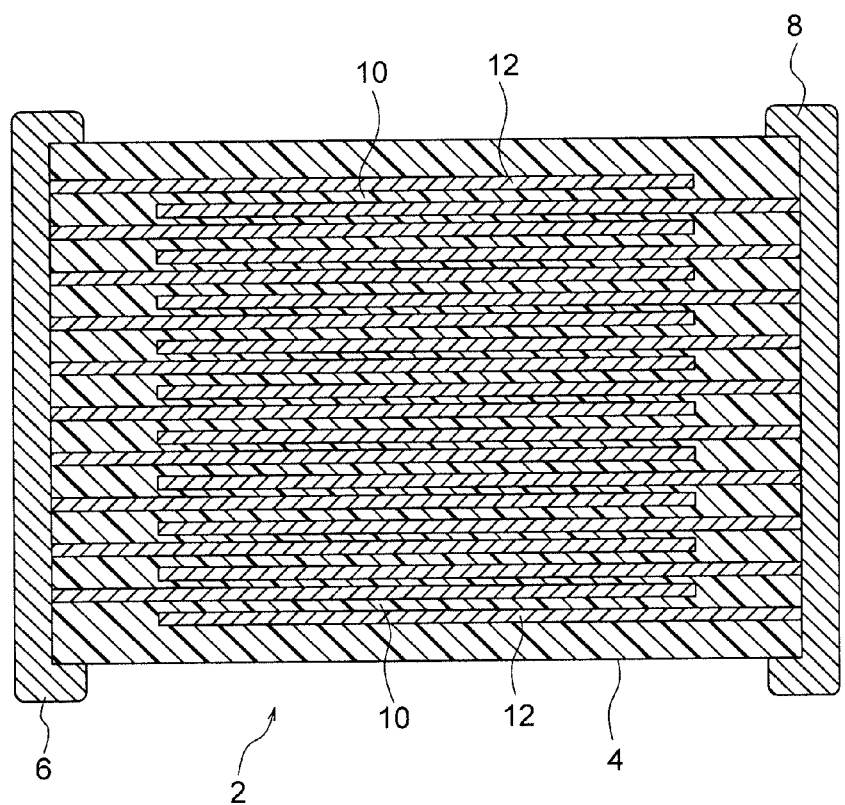
FIG. 1 is a schematic cross-sectional view of a multilayer ceramic capacitor according to an embodiment of the invention.

The present will be described below with reference to an embodiment illustrated in the drawings.

Overall Configuration of Multilayer Ceramic Capacitor

An overall configuration of a multilayer ceramic capacitor will be described as an embodiment of a multilayer ceramic electronic component of the invention.

As illustrated in FIG. 1, a multilayer ceramic capacitor 2 according to the embodiment includes an element body 4, a first terminal electrode 6, and a second terminal electrode 8. The element body 4 includes dielectric layers 10 and internal electrode layers 12, and the internal electrode layers 12 are laminated alternately between the dielectric layers 10.

A portion where the dielectric layers 10 and the internal electrode layers 12 are laminated alternately corresponds to an interior region (capacity region). The element body 4 includes exterior regions on both end surfaces in a laminating direction thereof. The exterior regions are made of dielectric layers thicker than the dielectric layers 10 which constitute the interior region.

The internal electrode layers 12 which are one part of alternate lamination are electrically connected to inside of the first terminal electrode 6 formed outside a first end portion of the element body 4 in an X-axis direction. The internal electrode layers 12 which are the other part of the alternate lamination are electrically connected to inside of the second terminal electrode 8 formed outside a second end portion of the element body 4 in the X-axis direction.

Materials of the dielectric layers 10 which constitute the capacity region and dielectric layers which constitute the exterior regions may be the same or may be different and may be made, for example, of the dielectric layers having, but not specifically limited to, a perovskite structure such as $ABO_3$ or the like. In $ABO_3$, A represents, for example, at least one of Ca, Ba, Sr, etc., and B represents at least one of Ti, Zr, etc. A molar ratio of A/B is not specifically limited, and ranges from 0.980 to 1.200.

In particular, the dielectric layers 10 preferably includes a main component including barium titanate ($BaTiO_3$) and an accessory component including boron oxide and/or lithium oxide. The boron oxide is exemplified by $B_2O_3$, and the lithium oxide is exemplified by $Li_2O$.

The main component, barium titanate, is represented, for example, by a composition formula $Ba_mTiO_{2+m}$, where m in the composition formula is $0.995 \leq m \leq 1.100$, and a ratio between Ba and Ti is $0.995 \leq Ba/Ti \leq 1.100$.

The boron oxide as an accessory component is preferably contained in the dielectric layers 10 in a range from 2.5 mole to 20 mole for 100 mole of the main component, barium titanate. Alternatively, the lithium oxide as an accessory component is preferably contained in the dielectric layers 10 in a range preferably from 2.5 mole to 20 mole for 100 mole of the main component, barium titanate.

Examples of other accessory components that may be contained in the dielectric layers 10 include following accessory components; at least one selected from a group of MgO, CaO, SrO, and BaO, or at least one selected from a group of $SiO_2$ and $Al_2O_3$, or at least one selected from a group of MnO, $Cr_2O_3$, and $V_2O_5$, or an R oxide ($R_2O_3$)(R is at least one selected from a group of Y, La, Ce, Pr, Nd, Sm, Eu, Gd, Tb, Dy, Ho, Er, Tm, Yb, and Lu. These other accessory components may be contained by an amount ranging, for example, from 0 mole to 10 mole, preferably from 1 mole to 5 mole based on 100 mole of barium titanate.

The internal electrode layers 12 contains copper (Cu) and/or silver (Ag) as a main component. As used herein the expression "contains (Cu) and/or silver (Ag) as a main component" is intended to mean that an alloy containing these metals may be included as a main component. Likewise, as used herein the expression "contains as a main component" is intended to mean that a proportion of copper, silver or an copper-silver alloy contained in the internal electrode layers 12 is 80 weight % or higher. The internal electrode layers 12 may contain elements other than copper, silver, or the copper-silver alloy.

The alloy containing copper (Cu) and/or silver (Ag) includes, but not specifically limited to, Ag—Pd alloy, for example.

Examples of materials which may be used for the terminal electrodes 6 and 8 include at least one of Ni, Pd, Ag, Au, Cu, Pt, Rh, Ru, Jr, etc, or an alloy of these elements. Normally, materials such as Cu, Cu alloy, Ni or Ni alloy, Ag, Pd, Ag—Pd alloy, or Ag—Pd—Ni alloy may be used. The terminal electrodes 6 and 8 may be composed respectively of multilayer electrodes.

For example, the terminal electrodes 6 and 8 each may include a three-layer structure including, from an inner side which is in contact with the element body 4, a copper paste baked electrode film, a nickel plated film, and a zinc plated film, or a two-layer structure including a copper paste baked electrode film and a baked electrode film containing silver as a main component. Alternatively, the terminal electrodes 6 and 8 each may include a resin electrode film made of a resin and metal particles.

The shape and the size of the multilayer ceramic capacitor 2 may be determined as appropriate according to the object and the application. Normally, the multilayer ceramic capacitor 2 having a cuboid shape has a dimension ranging from 0.4 mm to 5.7 mm in the X-axis direction, which is preferably a dimension ranging from 1 mm to 3.2 mm in the embodiment.

The height (a dimension in a Z-axis direction) of the multilayer ceramic capacitor 2, varying depending on the number of laminated layers in the dielectric layers 10 and the internal electrode layers 12, generally ranges from 0.2 mm to 3.2 mm, but in the embodiment, preferably ranges from 0.5 to 2.5 mm. Generally, the multilayer ceramic capacitor 2 has a dimension ranging from 0.2 mm to 5.0 mm in the Y-axis direction, which is preferably a dimension ranging from 0.5 mm to 2.5 mm in the embodiment.

In FIG. 1, although the thickness of the terminal electrodes 6 and 8 is illustrated to be thicker than the actual thickness for the sake of simple illustration, it is actually on the order of 10 µm to 50 µm, which is extremely thinner than the dimension in the X-axis direction. In the drawings, the X-axis, the Y-axis, and the Z-axis are perpendicular to each other, and the Z-axis corresponds to the laminating direction of the dielectric layers 10 and the internal electrode layers 12, and the X-direction corresponds to a direction in which the terminal electrodes 6 and 8 face each other.

The thickness of each of the dielectric layers 10 generally ranges from several µm to several tens of µm. However, the thickness of the dielectric layers 10 of the embodiment preferably ranges from 0.5 µm to 2 µm. The thickness of the internal electrode layers 12 preferably ranges from 0.7 µm to 3 µm.

Figure 2:
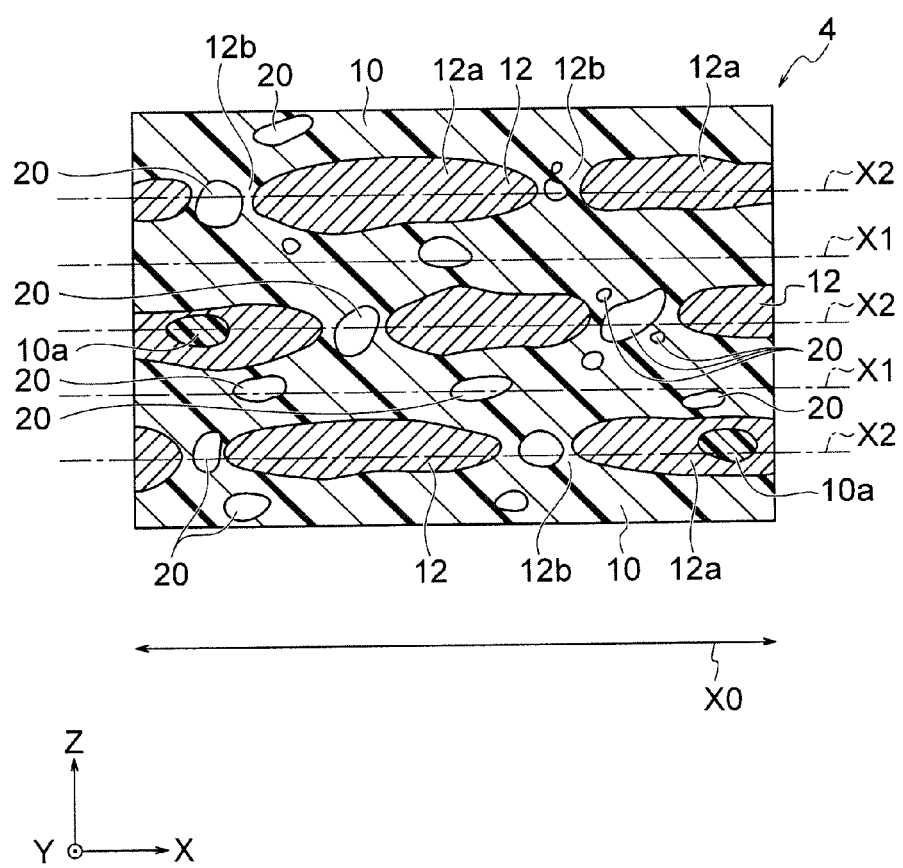
FIG. 2 is a rough sketch schematically illustrating an enlarged cross-sectional photograph of a multilayer structure of internal electrode layers and dielectric layers in the multilayer ceramic capacitor illustrated in FIG. 1.

As illustrated in FIG. 2, in the embodiment, when a picture of a cross section (a cross section parallel to the Z-axis) of the multilayer ceramic capacitor 2 illustrated in FIG. 1 is taken, the following characteristics appear on the cross section of the internal electrode layers 12 within an imaging range of (10 to 50 µm)×(10 to 50) µm, for example. In other words, each of the internal electrode layers 12 does not continue over the entire plane of the X-axis and the Y-axis in the cross section but includes electrode-present areas 12a appearing intermittently via a plurality of electrode-absent areas 12b. In the electrode-present areas 12a, conductive particles which constitute the internal electrode layers 12 continue in a direction of plane of X-axis and Y-axis.

In other words, in the embodiment, when the element body 4 is cut in a direction substantially perpendicular to the internal electrode layers 12 and a plane of section is observed, the electrode-present areas 12a and the electrode-absent areas 12b are arranged alternately in a range of a predetermined length X0 along a longitudinal direction (the X-axis direction or the Y-axis direction or an intermediate direction therebetween) arranged in each of the internal electrode layers 12, and at least two of the electrode-absent areas 12b are provided therein.

The electrode-absent areas 12b, appearing intermittently in the internal electrode layers 12 along the longitudinal direction thereof in a plane of section thereof, are areas where the conductive particles do not exist. In this configuration, the insulation properties can easily restore after the occurrence of the short circuit of the multilayer ceramic capacitor 2, and an initial capacitance (a capacitance before the occurrence of short circuit) may be increased.

From the viewpoint described above, in the embodiment, each of the internal electrode layers 12 preferably includes two to five electrode-absent areas 12b within a range of the predetermined length X0 along the longitudinal direction.

The electrode-absent areas 12b include an areas where adjacent dielectric layers are connected by dielectric particles which constitute the dielectric layers 10 and where voids 20 exist in which neither the dielectric particles nor the conductive particles exist. The voids 20 also exist in the dielectric layers 10. The dielectric particles 10a may be included in the interior of the internal electrode layers 12.

The electrode-absent areas 12b are not formed continuously in the X-axis direction or the Y-axis direction or in a plane direction therebetween in each of the internal electrode layers 12, but appear like islands in a plane (X-Y axes plane) of each of the internal electrode layers 12. Therefore, the electrode-present areas 12a of each of the internal electrode layers 12 are connected in some transverse cross section (plane of section) and, as a whole, continue in the X-axis direction and in the Y-axis direction as illustrated in FIG. 1. A width of each of the electrode-absent areas 12b in the X-axis direction or in the Y-axis direction (or the width in the intermediate direction between the X-axis and the Y-axis) is on the order of 1 to 10 times the thickness of each of the internal electrode layers 12.

In the embodiment, as illustrated in FIG. 2, when the element body 4 is cut in a direction substantially perpendicular to the internal electrode layers 12 and the plane of section is observed, a dielectric line segment X1 is drawn along the longitudinal direction (X-axis direction or Y-axis direction or the intermediate direction therebetween) of the dielectric layers 10 along a substantially center of a freely selected dielectric layer 10 in a thickness direction (Z-axis direction). A proportion of the void length on the dielectric line segment with respect to the predetermined length X0 of the dielectric line segment is then determined as a dielectric voidage.

Likewise, as illustrated in FIG. 2, an internal electrode line segment X2 is drawn along the longitudinal direction (X-axis direction or Y-axis direction or the intermediate direction therebetween) of the internal electrode layers 12 along a substantially center of a freely selected internal electrode layer 12 in a thickness direction (Z-axis direction). A proportion of the void length on the internal electrode line segment with respect to the predetermined length X0 of the internal electrode line segment is then determined as an internal electrode voidage. In the embodiment, the dielectric voidage is lower than the internal electrode voidage.

As result of intense examination of electronic components such as the multilayer ceramic capacitor 2, the present inventor has found that the following effects are achieved by satisfying such conditions that the internal electrode layers 12 contain copper or silver as a main component and that the dielectric voidage is lower than the internal electrode voidage, and consequently achieved the invention. In other words, after the occurrence of the short-circuit due to a high voltage or a mechanical stress, the insulation properties may be restored by passing a current (rated current) between the first terminal electrode 6 and the second terminal electrode 8 of the multilayer ceramic capacitor 2. Therefore, even when a current is passed again through the multilayer ceramic capacitor 2 having been subjected to the short-circuit, probability of heat generation is low because the insulation properties are restored.

From the view point described thus far, the dielectric voidage is preferably not higher than 0.7 times the internal electrode voidage, and more preferably ranges between 0.02 to 0.7 times.

The dielectric voidage is obtained, for example, by observing a freely selected nine planes of section in the capacity region (cross-sectional view of 50 μm×50 μm each), obtaining the dielectric voidage of each of the dielectric layers 10 appearing in each view, and obtaining an average of the obtained dielectric voidages.

The dielectric line segment X1 passes a substantially thickness-wise center of a freely selected dielectric layers 10 along the longitudinal direction of the dielectric layers 10. The internal electrode line segment X2 passes a substantially thickness-wise center of a freely selected internal electrode layer 12 along the longitudinal direction of the internal electrode layers 12. The substantially thickness-wise center of a freely selected dielectric layers 10 and the substantially thickness-wise center of a freely selected internal electrode layer 12 are determined by, for example, the following method.

First, auxiliary lines passing on the largest projecting parts of each of the internal electrode layers 12 are drawn along the longitudinal direction of the internal electrode layers 12 in the predetermined length X0. Next, a distance between two auxiliary lines interposing the dielectric layer 10 is determined as a thickness of the dielectric layer 10, and the substantially thickness-wise center of each of the dielectric layers 10 is determined based on the determined thickness. Next, a distance between two auxiliary lines interposing the internal electrode layer 12 is determined as a thickness of the internal electrode layer 12, and the substantially thickness-wise center of each of the internal electrode layers 12 is determined based on the determined thickness.

Figure 3A:
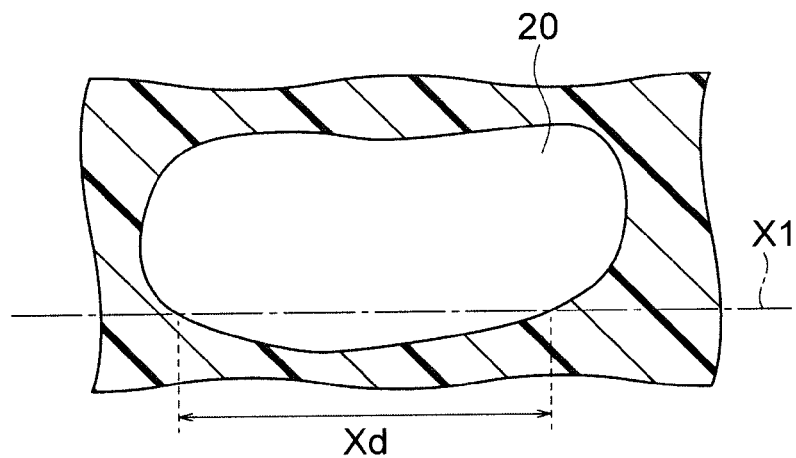
FIG. 3A is an enlarged view of a void illustrated in FIG. 2.

FIG. 3A is an enlarged view of one of the voids 20 in FIG. 2. The length of the void 20 on the dielectric line segment X1 corresponds to a length from one of intersections between a peripheral edge of the void 20 and the dielectric line segment X1 to the other intersection between the peripheral edge of the void 20 and the dielectric line segment X1, and is a length indicated by Xd in FIG. 3A.

In the predetermined length X0, the dielectric voidage of the dielectric line segment X1 is obtained by an expression; (the sum of the void length on the dielectric line segment X1 per one dielectric layer)/X0. The voids which are not on the dielectric line segment X1 are not considered in the expression for obtaining the dielectric voidage.

The internal electrode voidage is obtained, for example, by observing freely selected nine planes of section in the capacity region (cross-sectional view of 50 μm×50 μm each), obtaining the internal electrode voidage of each of the internal electrode layers 12 appearing in each view, and obtaining an average of the obtained internal electrode voidages.

Figure 3B:
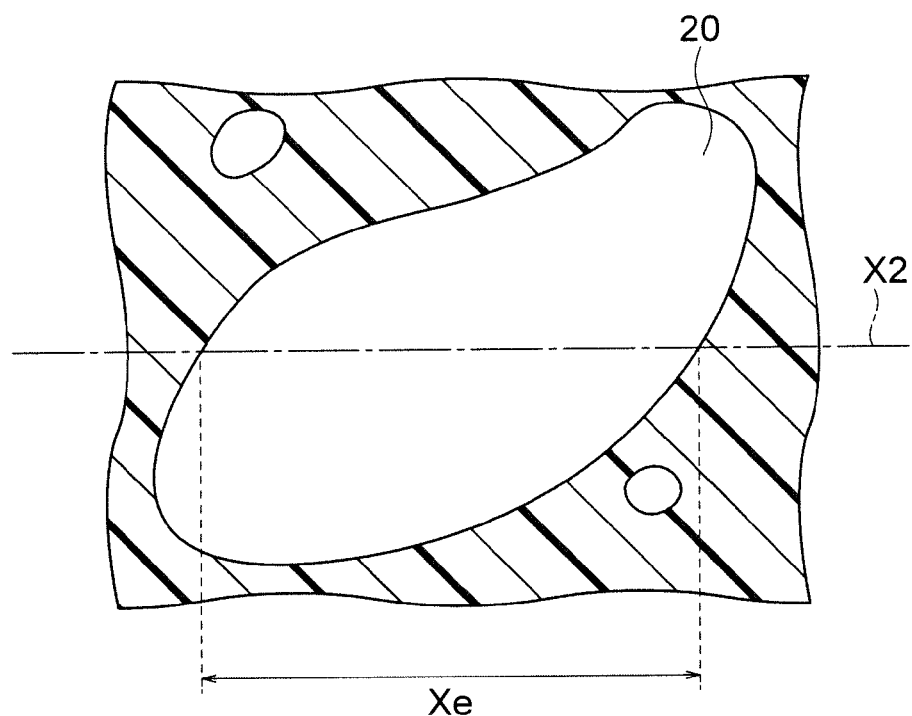
FIG. 3B is an enlarged view of the void illustrated in FIG. 2.

FIG. 3B is an enlarged view of one of the voids 20 in FIG. 2. The length of the void 20 on the internal electrode line segment X2 corresponds to a length from one of intersections between a peripheral edge of the void 20 and the internal electrode line segment X2 to the other intersection between the peripheral edge of the void 20 and the internal electrode line segment X2, and is a length indicated by Xe in FIG. 3B.

In the predetermined length X0, the internal electrode voidage of the internal electrode line segment X2 is obtained by an expression; (the sum of the lengths of the voids on the internal electrode line segment X2 per one internal electrode layer)/X0. The voids which are not on the internal electrode line segment X2 are not considered in the expression for obtaining the internal electrode voidage.

The predetermined length X0 is not specifically limited, but preferably ranges from 10 μm to 50 μm.

The reason why the insulation properties are restored by passing a current again through the multilayer ceramic capacitor 2 having been subjected to the short-circuit is considered as follows. It seems that when the above-described conditions are satisfied, a current flowing again through a portion of the internal electrode layers 12 where the short circuit occurred fuses and scatter internal electrodes, and consequently, the insulation properties are restored. If the dielectric layers 10 have many voids, the short-circuit may occur when a current is passed again because the internal electrodes fused and run through the voids 20 existing in the dielectric layers 10 may be connected to an internal electrode layer 12 having an opposite polarity. In contrast, the multilayer ceramic capacitor 2 of the embodiment includes predetermined voids 20 in the internal electrode layers 12 and, in addition, the voids in the dielectric layers 10 are limited. Specifically, the dielectric voidage is lower than the internal electrode voidage. Therefore, when the internal electrodes fuse, the fused internal electrodes may stay in the internal electrode layers 12 without running along the dielectric layers 10. Therefore, self-repairing seems to be promoted.

The high voltage which causes the short-circuit is not specifically limited, but is a voltage of 2.5 times or more the rated voltage (10 V to 630 V) of the multilayer ceramic capacitor 2.

In the embodiment, the number of the electrode-absent areas 12b within the range of the predetermined length X0 along the longitudinal direction (the X-axis direction, the Y-axis direction, or the intermediate direction therebetween) of the outermost internal electrode layers 12 in the laminating direction is larger than that of the center portion of the internal electrode layers 12 in the laminating direction (Z-axis direction) illustrated in FIG. 1. For example, Ec/Ee is preferably smaller than 1 and, more preferably, ranges from 0.2 to 0.8, where Ec is the number of the electrode-absent area in the center portion of the laminating direction and Ee is the number of the electrode-absent area in the outermost layer of the laminating direction.

On the outermost layer in the laminating direction, a short circuit between the internal electrode layers 12 may occur more often than the center in the laminating direction. Therefore, by increasing the number of the electrode-absent area in the internal electrode layers 12 on the outermost layer in the laminating direction, when a short circuit occurs between the internal electrode layers 12 on the outermost layer in the laminating direction, restoration of insulation at the short-circuited site is promoted. In the internal electrode layers 12 located in a center portion in the laminating direction, the initial capacitance may be increased by relatively reducing the number of the electrode-absent area.

In addition, in the embodiment, the electrode-present areas 12a of the internal electrode layers 12 contain the dielectric particles 10a containing barium titanate as a main component as illustrated in FIG. 2. In this configuration, insulation properties are easily restored after an occurrence of a short circuit. In the embodiment, the electrode-absent areas 12b of the internal electrode layers 12 include the voids 20. In this configuration, insulation properties are easily restored after an occurrence of a short circuit. In addition, in the embodiment, the voids 20 are also included in the dielectric layers 10.

The size of the voids 20 is not specifically limited, but preferably ranges from 0.2 μm to 3 μm in cross-section-converted diameter. As used herein, the term "the cross-section-converted diameter" is a size of the void 20 obtained by measuring the cross-sectional area of the cross-sectioned void 20 and converting the measured cross-sectional area into a diameter of a circle having the same sectional area.

In the embodiment, the area ratio of the voids 20 included in the internal electrode layer 12 on the outermost layer in the laminating direction is larger than that in the center portion of the internal electrode layers 12 in the laminating direction. For example, Vc/Ve is preferably smaller than 1, and more preferably, ranges from 0.2 to 0.8, where Vc is an area ratio of the voids 20 with respect to the area of the internal electrode layers 12 in the center portion in the laminating direction and Ve is a ratio of the area of the voids 20 with respect to the area of the internal electrode layer 12 on the outermost layer in the laminating direction. In this configuration, insulation properties are easily restored after an occurrence of a short circuit. The reason seems to be that heat is not dispersed easily out from the element body 4 if the area ratio of the voids included in the internal electrode layers 12 on the outermost layer in the laminating direction is large.

In the embodiment, when the element body 4 is cut in a direction substantially perpendicular to the internal electrode layers 12 and the plane of section is observed, an exterior void ratio RSe indicating the area ratio of the voids 20 included in the exterior regions is larger than the capacity void ratio RSc indicating the area ratio of the voids 20 included in the capacity region. Rse/Rsc is preferably larger than 1 and more preferably, ranges from 1.1 to 2. When the value of Rse/Rsc is too small, the advantageous effect of the embodiment is small, and when it is too large, the capacity region may not be protected sufficiently by the exterior regions.

The exterior void ratio RSe is obtained by observing a freely selected nine cross sections in the exterior regions (cross-sectional view of 50 μm×50 μm each), obtaining the area ratio of the voids 20 in each cross-sectional view, and obtaining an average of the obtained area ratios. The capacity void ratio RSc is obtained by observing freely selected nine cross sections in the capacity region (cross-sectional view of 50 μm×50 μm each), obtaining the area ratio of the voids 20 in each cross-sectional view, and obtaining an average of the obtained area ratios. In the capacity region, the voids 20 appear both in the dielectric layers 10 and the internal electrode layers 12. However, in the exterior regions, the voids 20 appear only in the dielectric layers.

Especially, in the embodiment, the amount of boron (Bs) contained in the dielectric layers 10 located at a portion near the outer surface of the element body 4 illustrated in FIG. 1 is preferably smaller than the amount of boron (Bc) contained in the dielectric layers 10 located at a central portion of the element body 4. In this configuration, a deflection strength or a crack strength of the multilayer ceramic capacitor 2 is improved because, among others, a joint strength between the terminal electrodes 6 and 8 and the element body 4 is improved and defects such as lowering of the strength of the outer surface due to a reaction of boron contained in the outer surface with moisture in the air is likely to be reduced. The content ratio Bs/Bc preferably ranges from 0.5 to 0.95, and a debinding time, a sintering time, an annealing time of the element body 4 may be controlled to control the content ratio Bs/Bc adequately. The longer these times, the smaller the content ratio Bs/Bc tends to be.

A Method of Manufacturing Multilayer Ceramic Capacitor

Next, a method of manufacturing the multilayer ceramic capacitor 2 will be described as an embodiment of the invention.

First, a paste for the dielectric layers is prepared for manufacturing green sheets which constitute the dielectric layers 10 illustrated in FIG. 1 after sintering.

The paste for dielectric layers is usually made of an organic-solvent-based paste obtained by kneading a ceramic powder with an organic vehicle, or of an aqueous paste.

A raw material of the ceramic powder may be selected as appropriate from various compounds such as composite oxide or an oxide, for example, from a carbonate, a nitrate, a hydroxide, an organometallic compound and the like, which constitutes the above-described dielectric layers 10 and can be mixed for use. The row material of the ceramic powder used in the embodiment is preferably a powder having an average grain size on the order of 0.01 to 1 um. In order to obtain an extremely thin green sheet, a powder finer than the thickness of the green sheet is preferably used.

The organic vehicle is an organic solvent containing a binder dissolved therein. The binder used for the organic vehicle may be selected from normally used various binders such as, but not specifically limited to, acrylic, ethyl cellulose, and the like as appropriate.

The organic solvent to be used is may be selected from various organic solvents such as, but not specifically limited to, terpineol, butyl carbitol, alcohol, methyl ethyl ketone, acetone, toluene and the like depending on the method to be used such as a printing method or a sheet method.

The paste for the dielectric layers may be added with an additive selected from various dispersants, plasticizes, dielectrics, accessory-component chemical compound, glass frit, insulators, and the like if necessary.

Examples of the plasticizer include phthalic acid esters such as dioctyl phthalate, benzylbutyl phthalate, and the like, adipic acid, phosphoric esters, glycols, and the like.

The binder is preferably less than 10 parts by weight for 100 parts by weight of the dielectric material. Accordingly, the dielectric voidage is lower than the internal electrode voidage.

Subsequently, a paste for the internal electrode layers for forming the internal electrode layers 12 illustrated in FIG. 1 is prepared. The paste for the internal electrode layers is prepared by kneading conductive materials made of the above-described various conductive metals or alloys with the organic vehicle described above. Instead of conductive materials, oxides, organometallic compound, resinate, or the like may also be used. The oxide, the organometallic compound, and the resinate described above serve as the conductive material as described above after sintering. The paste for the internal electrode layers may include ceramic powder (e.g., barium titanate powder) as an inhibitor, if necessary. The inhibitor acts to suppress sintering of the conductive powder in the sintering process.

Using the paste for the dielectric layers and the paste for the internal electrode layers adjusted in the process described above, the green sheets serving as the dielectric layers 10 after sintering and the internal electrode pattern layers serving as the internal electrode layers 12 after sintering are laminated alternately to manufacture an internal multilayer body serving as the interior region after sintering as illustrated in FIG. 1. After or before the internal multilayer body is manufactured, by using the paste for the dielectric layers, the green sheets serving as the dielectric layers in the exterior regions after sintering is formed.

Specifically, the green sheets are formed first on carrier sheets (e.g. PET film) as a support by a doctor blade method or the like. The green sheets are dried after having been formed on the carrier sheets.

Subsequently, the internal electrode pattern layers are formed by using paste for the internal electrode layers on the surface of the green sheets formed in the process described above to obtain a green sheets having the internal electrode pattern layers. Then, the obtained green sheets each having the internal electrode pattern layer are laminated alternately to obtain the internal multilayer body. Note that examples of the method of forming the internal electrode pattern layers include, but not specifically limited to, a printing method and a transfer method. Note that the green sheets each having the internal electrode pattern layers may be laminated via adhesive layers.

The green sheets (the outer green sheets) serving as the dielectric layers in the exterior regions are formed on the carrier sheets as a support in the same manner as the green sheets serving as the interior region (inner green sheets). The outer green sheets are formed on the carrier sheets and then are dried.

Note that, instead of laminating the internal multilayer body on the outer green sheets, the inner green sheets and the internal electrode pattern layers may be alternately laminated directly on the outer green sheets by a predetermined number of layers. Alternatively, multilayer body units formed by laminating a plurality of inner green sheets and a plurality of internal electrode pattern layers alternately may be prepared in advance and laminated on an outer green sheet in a predetermined number of layers.

The obtained green multilayer body is cut to a predetermined size along cutting lines, for example, to form green chips. By drying and solidifying the green chips, plasticizer is removed and thus the green chips are solidified. The green chips after having been solidified and dried are loaded into a barrel container together with media and polishing liquid, and is subjected to barrel polishing by a horizontal centrifugal barrel machine. The green chips after having been subjected to the barrel polishing are washed with water and dried.

The dried green chips are debinded and sintered, and annealed if necessary, so that the element body 4 illustrated in FIG. 1 is obtained. Note that when the internal electrode pattern layers serving as the internal electrode layers 12 contains copper, the temperature condition for sintering is preferably temperatures lower than 1085° C., a melting point of copper, that is, temperatures ranged from 900° C. to 1080° C. are preferable. Likewise, when the internal electrode pattern layers serving as the internal electrode layers 12 contains silver, the temperature condition at the time of sintering is preferably temperatures lower than 962° C., a melting point of copper, that is, temperatures ranged from 800° C. to 960° C. are preferable.

The temperature increase rate at the time of sintering is preferably lower than 200° C./hr. Accordingly, the dielectric voidage is lower than the internal electrode voidage.

The sintered body (element body 4) thus obtained is subjected to edge polishing by barrel polishing and the like, and the terminal electrodes 6 and 8 are formed by sintering the paste for terminal electrodes. When necessary, the terminal electrodes 6 and 8 are plated to form a pad layer. The paste for the terminal electrode layers may be prepared in the same manner as the above-described paste for the internal electrode layers.

The multilayer ceramic capacitor 2 manufacture in this manner is mounted on a printed board by soldering or with conductive adhesive agent, and is used in various electronic apparatuses.

In the embodiment, adjustment is performed to make the dielectric voidage lower than the internal electrode voidage. For example, the dielectric voidage and the internal electrode voidage may be adjusted respectively by the temperature increase rate in the sintering conditions and the amount of binder.

Note that the invention is not limited to the above-described embodiment, and includes other various modifications within a scope of the invention.

For example, the multilayer ceramic electronic component of the invention is not limited to the multilayer ceramic capacitor, but may be applied to other multilayer ceramic electronic components. Examples of other multilayer ceramic electronic components may include all the electronic components in which the dielectric layers are laminated via internal electrodes, such as band-pass filters, multilayer three terminal filters, piezoelectric elements, PTC thermistors, NTC thermistors, and varistors.

EXAMPLES

The invention will be described based on further detailed Examples. However, the invention is not limited to these Examples.

Example 1

First, $BaTiO_3$ powder having a particle diameter ranging from 0.05 μm to 1 μm was prepared as a raw material powder of a main raw material, and then $MgCO_3$, $MnCO_3$, $Y_2O_3$, $B_2O_3$ were prepared as accessory components. The accessory components were subjected to preliminary grinding in advance and were processed to have a diameter on the order of 0.03 μm to 0.2 μm, which is a diameter smaller than a particle diameter of a barium titanate raw material such as.

The respective raw material powder prepared in the process described above were weighted by 0.5 mole of $MgCO_3$ powder, 0.2 mole of $MnCO_3$ powder, 1.0 mole of $Y_2O_3$ powder, and 10 mole of $B_2O_3$ powder for 100 mole of main raw material powder. These powders were mixed by wet mixing in a ball mill, and then were dried to obtain a dielectric raw material. $MgCO_3$ and $MnCO_3$ added at this time were to be contained in the dielectric layers 10 respectively as MgO, MnO after sintering.

Subsequently, 100 parts by weight of the obtained dielectric raw materials; 7 parts by weight of acrylic resin, 4 parts by weight of butyl benzyl phthalate (BBP) as a plasticizer, 80 parts by weight of methyl ethyl ketone as a solvent were mixed in a ball mill to obtain a paste and the paste for the dielectric layers was obtained. Separately from the above, 56 parts by weight of Cu particles, 40 parts by weight of terpineol, 4 parts by weight of ethyl cellulose, and 1 parts by weight of benzotriazole were kneaded by 3 rolls to form a paste for the paste for the internal electrode layers. The average particle size of the Cu particles is 1 μm.

Then, green sheets were formed on a PET film by using the paste for the dielectric layers prepared in the process described above. Then, green sheet were formed on a PET film by using the paste for the dielectric layers for forming the exterior regions. The paste for the internal electrode was screen-printed and green sheets for the interior region was formed.

A plurality of green sheets for the interior region having the internal electrode layers and the green sheets for the exterior regions were laminated and were adhered by pressure and a green multilayer body was obtained, then the green multilayer body is cut into a predetermined size to obtain green chips.

Then, the obtained green chips were subjected to binder removal treatment, sintering, and annealing under the following conditions, and thus a sintered bodies were obtained.

Conditions of the binder removal treatment were set to a temperature increase rate of 25° C./hour, a retaining temperature of 260° C., a retention time of 8 hours, and in the aerial atmosphere.

The sintering conditions were set at a temperature increase rate of 10° C./hour and a retaining temperature of 1000° C., and a retention time was set to 120 minutes. The cooling rate was set at 200° C./hour. The atmosphere gas was made of a humidified $N_2+H_2$ gas mixture, and the oxygen partial pressure was set to be not more than $10^{-9}$ MPa.

Annealing conditions were: a temperature increase rate of 200° C./hour, a retaining temperature of 1000° C., a retention time of 10 hours, a cooling rate of 200° C./hour, and humidified $N_2$ gas (oxygen partial pressure of $10^{-8}$ MPa or less) as atmosphere gas.

A wetter was used to humidify the ambient gas during sintering and annealing.

Then, after end faces of the sintered bodies obtained were subjected to barrel polishing, application of a Cu paste as a terminal electrode, and a baking process in a reducing atmosphere were performed to obtain a plurality of multilayer ceramic capacitor samples (hereinafter sometimes simply referred to as "capacitor samples") according to Example 1. FIG. 2 illustrates a schematic enlarged cross-sectional view of a principal portion of a capacitor sample according to Example 1.

Examples 2 to 4, Comparative Examples 1 to 3

In the same manner as in Example 1, a plurality of capacitor samples according to Examples 2 to 4 and Comparative Examples 1 to 3 were prepared except that the temperature increase rate at the time of sintering was set as described in Table 1.

Comparative Example 4

In the same manner as in Example 2, a plurality of capacitor samples according to Comparative Example 4 were prepared except that 56 parts by weight of Ni particles were used instead of 56 parts by weight of Cu particles.

Example 5

In the same manner as in Example 2, a plurality of capacitor samples according to Example 5 were prepared except that 56 parts by weight of Ag particles were used instead of 56 parts by weight of Cu particles.

Example 6

In the same manner as in Example 2, a plurality of capacitor samples according to Example 6 were prepared except that 10 mole of $Li_2O$ as the accessory component was weighted instead of 10 mole of $B_2O_3$ for 100 mole of main raw material.

Example 7

In the same manner as in Example 2, a plurality of capacitor samples according to Example 7 were prepared except that 5 mole of $Li_2O$ was weighted in addition to 5 mole of $B_2O_3$ as the accessory component for 100 mole of main raw material.

Examples 8, 9, Comparative Example 7

In the same manner as in Example 3, a plurality of capacitor samples according to Examples 8, 9 and Comparative Examples 7 were prepared except that the added quantity of acrylic resin was changed.
Measurement The capacitor samples obtained from Examples 1 to 9 and Comparative Examples 1 to 4 and 7 were measured as described below. Results are shown in Table 1 and Table 2.
(Measurement of Voidage)

For each example and comparative example, polishing was conducted for planes perpendicular to the plane of the internal electrode layers of the multilayer ceramic capacitor sample (e.g., cross sections including X and Z axes, and cross sections including Y and Z axes). Then, the capacity region of the polished surfaces were observed in an enlarged scale by a scanning electron microscope (SEM) at a magnification of 3000 times for nine visual fields (50 μm×50 μm for each field of view).

The average dielectric voidage obtained by obtaining the dielectric voidages of the respective layers of dielectric layers 10 appearing in each field of view and averaging is shown as dielectric voidage in Table 1 and Table 2. Likewise, the average internal electrode voidage obtained by obtaining the internal electrode voidage of the respective layers of internal electrode layers 12 appearing in each field of view and averaging is shown as internal electrode voidage in Table 1 and Table 2. Also, the average dielectric voidage/the average internal electrode voidage are shown in Table 1 and Table 2 as dielectric voidage/the internal electrode voidage.
(Insulation Restoration Properties (Self Repairing Properties) Test)

A plurality of capacitor samples in each examples and comparative examples were prepared and a voltage of 1000 V was applied to these samples to force the internal electrodes to short-circuit to achieve 10Ω or less, ten samples were prepared for each example and comparative example, a current of 2.5 A was passed through these samples, and the number of samples which restored the insulation to 10 kΩ or higher was examined. Results are shown in Table 1 and Table 2. In the item of the insulation restoration in Table 1 and Table 2, the denominator of the numerical value is the number of samples tested, and the numerator indicates the number of samples having restored to in insulation.
Evaluation According to Table 1 and Table 2, it was confirmed that self repairing properties were better in the cases where the internal electrode layers contain Cu or Ag as a main component and the dielectric voidage is lower than the internal electrode voidage (Examples 1 to 9) than in the case (Comparative Examples 1 to 3) where the internal electrode layers contain Cu as the main component but the dielectric voidage/internal electrode voidage is 1 or higher.

From Table 1 and Table 2, it was confirmed that a case where the internal electrode layers contain Cu or Ag as a main component and the dielectric voidage is lower than the internal electrode voidage (Examples 1 to 9) exhibits preferable self repairing properties compared with a case where the internal electrode layers contain Ni as a main component (Comparative Example 4) even though the value of dielectric voidage/internal electrode voidage was 0.7.

From Table 1 and Table 2, it was confirmed that when the internal electrode layers contain Cu or Ag as a main component, and the value of the dielectric voidage/internal electrode voidage was 0.7 or lower (Examples 1, 2, 5 to 9), the further desirable self repairing properties were achieved.

TABLE 1

| | Dielectric Voidage/ Internal Electrode Voidage | Self Repairing Properties | Internal Electrode | Presence or Absence of B, Li | Dielectric Voidage | Internal Electrode Voidage | Temperature Increase Rate (° C./h) |
|---|---|---|---|---|---|---|---|
| Example 1 | 0.2 | 10/10 | Cu | $B_2O_3$ | 4.0% | 20.0% | 10 |
| Example 2 | 0.7 | 10/10 | Cu | $B_2O_3$ | 4.0% | 5.7% | 50 |
| Example 3 | 0.8 | 8/10 | Cu | $B_2O_3$ | 4.0% | 5.0% | 150 |
| Example 4 | 0.9 | 5/10 | Cu | $B_2O_3$ | 4.0% | 4.4% | 175 |
| Comparative Example 1 | 1 | 0/10 | Cu | $B_2O_3$ | 4.0% | 4.0% | 200 |
| Comparative Example 2 | 1.2 | 0/10 | Cu | $B_2O_3$ | 4.0% | 3.3% | 250 |
| Comparative Example 3 | 5 | 0/10 | Cu | $B_2O_3$ | 4.0% | 0.8% | 400 |
| Comparative Example 4 | 0.7 | 0/10 | Ni | $B_2O_3$ | 4.0% | 5.7% | 50 |
| Example 5 | 0.7 | 10/10 | Ag | $B_2O_3$ | 4.0% | 5.7% | 50 |
| Example 6 | 0.7 | 10/10 | Cu | $Li_2O$ | 4.0% | 5.7% | 50 |
| Example 7 | 0.7 | 10/10 | Cu | $Li_2O + B_2O_3$ | 4.0% | 5.7% | 50 |

TABLE 2

|  | Dielectric Voidage/ Internal Electrode Voidage | Self Repairing Properties | Internal Electrode | Presence or Absence of B, Li | Dielectric Voidage | Internal Electrode Voidage | Acrylic Resin (Parts by weight) |
|---|---|---|---|---|---|---|---|
| Example 3 | 0.8 | 8/10 | Cu | $B_2O_3$ | 4.0% | 5.0% | 7 |
| Example 8 | 0.02 | 10/10 | Cu | $B_2O_3$ | 0.1% | 5.0% | 1 |
| Example 9 | 0.2 | 10/10 | Cu | $B_2O_3$ | 1.0% | 5.0% | 3 |
| Comparative Example 7 | 2 | 0/10 | Cu | $B_2O_3$ | 10.0% | 5.0% | 10 |

DESCRIPTION OF THE REFERENCE NUMERAL 2 multilayer ceramic capacitor
4 element body
6 first terminal electrode
8 second terminal electrode
10, 100 dielectric layer
10a dielectric particle
12, 120 internal electrode layer
12a electrode-present area
12b electrode-absent area
20 void
X1 dielectric line segment
X2 internal electrode line segment

What is claimed is:

1. A multilayer ceramic electronic component comprising an element body including dielectric layers and internal electrode layers having different polarities laminated alternately, wherein
   the internal electrode layers contain copper and/or silver as a main component, and
   a dielectric voidage of the dielectric layers is lower than an internal electrode voidage of the internal electrode layers, the dielectric voidage indicates a proportion of a length of voids existing on a dielectric line segment with respect to a predetermined length of the dielectric line segment passing through a thickness-wise center of a freely selected layer of the dielectric layers and extending along a longitudinal direction of the dielectric layers, and the internal electrode voidage indicates a proportion of a length of voids existing on an internal electrode line segment with respect to a predetermined length of the internal electrode line segment passing through a substantially thickness-wise center of a freely selected layer of the internal electrode layers and extending in a longitudinal direction of the internal electrode layers.

2. The multilayer ceramic electronic component according to claim 1, wherein the dielectric layers comprise a main component including barium titanate and an accessory component including boron oxide and/or lithium oxide.

3. The multilayer ceramic electronic component according to claim 2, wherein the dielectric voidage is 0.7 times the internal electrode voidage or lower.

4. The multilayer ceramic electronic component according to claim 2, wherein the predetermined length ranges from 10 to 50 μm.

5. The multilayer ceramic electronic component according to claim 3, wherein the predetermined length ranges from 10 to 50 μm.

6. The multilayer ceramic electronic component according to claim 1, wherein the dielectric voidage is 0.7 times the internal electrode voidage or lower.

7. The multilayer ceramic electronic component according to claim 6, wherein the predetermined length ranges from 10 to 50 μm.

8. The multilayer ceramic electronic component according to claim 1, wherein the predetermined length ranges from 10 to 50 μm.

* * * * *